United States Patent
Suwa et al.

(10) Patent No.: US 7,438,982 B2
(45) Date of Patent: Oct. 21, 2008

(54) MAGNETIC RECORDING MEDIUM INCLUDING DISK SUBSTRATE, MAGNETIC LAYER, AND NON-MAGNETIC LAYER

(75) Inventors: Takahiro Suwa, Tokyo (JP); Mitsuru Takai, Tokyo (JP); Kazuhiro Hattori, Tokyo (JP); Shuichi Okawa, Tokyo (JP); Mikiharu Hibi, Tokyo (JP)

(73) Assignee: TDK Corporation, Tokyo (JP)

( * ) Notice: Subject to any disclaimer, the term of this patent is extended or adjusted under 35 U.S.C. 154(b) by 505 days.

(21) Appl. No.: 11/065,142

(22) Filed: Feb. 24, 2005

(65) Prior Publication Data

US 2005/0196650 A1 Sep. 8, 2005

(30) Foreign Application Priority Data

Mar. 3, 2004 (JP) ............................. 2004-059113

(51) Int. Cl.
*G11B 5/66* (2006.01)
*G11B 5/72* (2006.01)

(52) U.S. Cl. .................. 428/826; 428/141; 428/156; 428/157; 428/163; 428/167

(58) Field of Classification Search ............ None
See application file for complete search history.

(56) References Cited

U.S. PATENT DOCUMENTS

| | | | |
|---|---|---|---|
| 4,935,278 A | | 6/1990 | Krounbi et al. |
| 5,626,941 A | * | 5/1997 | Ouano ...................... 428/141 |
| 5,958,542 A | * | 9/1999 | Ootake et al. ............ 428/833.5 |
| 6,014,296 A | | 1/2000 | Ichihara et al. |
| 6,351,339 B1 | * | 2/2002 | Bar-Gadda ................. 360/55 |
| 6,495,240 B1 | * | 12/2002 | Wada et al. ................. 428/156 |
| 6,665,145 B2 | * | 12/2003 | Wada ........................ 360/133 |
| 7,244,521 B2 | * | 7/2007 | Liu et al. .................. 428/833.3 |
| 2004/0170871 A1 | * | 9/2004 | Pocker et al. .......... 428/694 TP |
| 2005/0196650 A1 | | 9/2005 | Suwa et al. |

FOREIGN PATENT DOCUMENTS

| | | |
|---|---|---|
| JP | 62-047801 | 3/1987 |
| JP | 01-184717 | 7/1989 |
| JP | 05-028469 | 2/1993 |
| JP | 5-22291 | 3/1993 |
| JP | 05-073879 | 3/1993 |
| JP | 9-97419 | 4/1997 |
| JP | 2000-298822 | 10/2000 |
| JP | 2000-298823 | 10/2000 |
| JP | 2002-121051 | 4/2002 |
| JP | 2003-109210 | 4/2003 |

OTHER PUBLICATIONS

U.S. Appl. No. 11/206,874, filed Aug. 19, 2005, Takai et al.

* cited by examiner

*Primary Examiner*—Kevin M Bernatz
(74) *Attorney, Agent, or Firm*—Oblon, Spivak, McClelland, Maier & Neustadt, P.C.

(57) ABSTRACT

A magnetic recording medium includes at least a disk substrate, a magnetic recording layer formed with a predetermined concavo-convex pattern on the disk substrate, and a non-magnetic layer formed in concave portions of the concavo-convex pattern. Convex shapes made of a non-magnetic material are formed on the magnetic recording layer or the non-magnetic layer. Each convex shape is formed, for example, into a mountain-like shape whose upper surface width is made smaller than a width of each convex portion of the magnetic recording layer or a width of each concave portion where the non-magnetic layer 6 is formed.

17 Claims, 8 Drawing Sheets

MAGNETIC RECORDING MEDIUM INCLUDING DISK SUBSTRATE, MAGNETIC LAYER, AND NON-MAGNETIC LAYER

BACKGROUND OF THE INVENTION

The present invention relates to a magnetic recording medium, and particularly relates to a magnetic recording medium having a surface structure effective in preventing stiction between a magnetic head and the magnetic recording medium.

Magnetic recording media such as hard disks have been conspicuously improved in areal density by improved techniques such as finer granulation of magnetic particles for forming magnetic recording layers, alteration of materials, and finer head processing. Further improvement in areal density will be expected in the future. However, the improved techniques adopted till now have elicited problems as to side fringes, crosstalk, etc. due to a limit of head processing and a spread of a magnetic field. Thus, the improvement in areal density using the background-art techniques has reached its limit.

As one of solutions against the problems, that is, as one of techniques, which can improve the areal density of magnetic recording media, there have been proposed discrete track type magnetic recording media (for example, see JP-B-5-22291/(1993) or JP-A-9-97419/(1997)). A typical discrete track type magnetic recording medium has a magnetic recording layer formed with concentric track patterns, and a non-magnetic layer filled into concave portions between adjacent ones of tracks so as to extend continuously in the track direction and separate the concentric track patterns from each other.

For example, Patent Document JP-B-5-22291 discloses a mode of such a discrete track type magnetic recording medium in which a non-magnetic layer provided for separating concentric track patterns from each other is formed as a flat surface in a position higher than the thickness-direction upper surface position on a magnetic recording layer comprised of the concentric track patterns. In addition, Patent Document JP-B-5-22291 discloses another mode in which the non-magnetic layer is formed also on the magnetic recording layer. Also in that mode, as disclosed in Patent Document JP-B-5-22291, the non-magnetic layer provided for separating the concentric track patterns from each other is formed as a flat surface in a position higher than the thickness-direction upper surface position on the non-magnetic layer provided on the magnetic recording layer. Further, Patent Document JP-B-5-22291 discloses the mode in which the non-magnetic layer is formed also on the magnetic recording layer, in which the non-magnetic layer provided as a flat surface for separating the concentric track patterns has the same thickness-direction height as the non-magnetic layer formed as a flat surface on the magnetic recording layer comprised of the concentric track patterns.

In manufacturing of such a discrete track type magnetic recording medium, a non-magnetic material is often filled into a concave portion between adjacent tracks formed by concentric track patterns. Thus, the upper surface of the magnetic recording medium is made flat enough to suppress fluctuation in flying of a magnetic head flying on the magnetic recording medium due to an air flow. As a method for filling the non-magnetic material into the concave portion between adjacent tracks, a film formation technique such as sputtering to be used in the field of semiconductor manufacturing is used. However, when the film formation technique is used, the non-magnetic material is formed not only between the tracks but also on the upper surface of the magnetic recording layer. Thus, a large difference in level is formed on the surface of the magnetic recording medium due to the non-magnetic material formed as a layer on the magnetic recording layer.

Due to the existence of such a large difference in level, the gap length between the magnetic head flying on the magnetic recording medium due to an air flow and the magnetic recording layer is increased. Thus, there occurs a problem that the sensitivity is lowered, the flying height of the magnetic head on the magnetic recording medium is made unstable, or foreign matters are accumulated easily. It is therefore desired to flatten the surface of the magnetic recording layer while removing the non-magnetic material formed as a layer on the magnetic recording layer. A processing technique such as CMP (Chemical Mechanical Polishing), for example, used in the field of semiconductor manufacturing is used as such a flattening method.

However, in any one of the magnetic recording media disclosed in Patent Document JP-B-5-22291, the upper surface of the non-magnetic layer formed out of a non-magnetic material is a flat surface. Thus, there is a problem that a magnetic head flying on the magnetic recording medium due to an air flow in a hard disk drive or the like is stuck onto the flat surface easily, so that the magnetic head is crushed easily. On the other hand, when the aforementioned CMP method or the like is used to flatten the surface of the magnetic recording medium, there is a problem that the magnetic head is easily stuck onto the magnetic recording medium so that the magnetic head is crushed easily.

Further, with a request to increase the areal density, the flying height of the magnetic head may be not higher than 10 nm. In such a case, the magnetic head and the magnetic recording medium are brought into intermittent contact with each other, that is, they have contact with each other on one occasion, but have no contact with each other on another occasion. In this state, when the surface of the magnetic recording medium is too flat, there is a problem that friction between the magnetic head and the magnetic recording medium increases so that the magnetic head is crushed easily for the same reason as mentioned above.

SUMMARY OF THE INVENTION

The present invention was developed to solve the foregoing problems. It is an object of the invention to provide a magnetic recording medium having a surface structure effective in preventing stiction between the magnetic recording medium and a magnetic head.

In order to solve the foregoing problems, a magnetic recording medium according to the invention at least includes a disk substrate, a magnetic recording layer formed with a predetermined concavo-convex pattern on the disk substrate, and a non-magnetic layer formed in concave portions of the concavo-convex pattern. Convex shapes made of a non-magnetic material are formed on the magnetic recording layer or the non-magnetic layer. The magnetic recording medium is characterized in that width of an upper surface of each of the convex shapes is smaller than width of each convex portion of the concavo-convex pattern of the magnetic recording layer or width of each of the concave portions where the non-magnetic layer is formed.

According to the invention, convex shapes made of a non-magnetic material are formed on the magnetic recording layer or the non-magnetic layer, and the width of the upper surface of each convex shape is smaller than the width of each convex portion of the concavo-convex pattern of the magnetic recording layer or the width of each concave portion where the non-magnetic layer is formed. Accordingly, due to the existence of the convex shapes each having a small upper surface width, the contact area between the magnetic recording medium and the magnetic head thereon is reduced so that the increase of the frictional resistance between the magnetic head and the magnetic recording medium can be suppressed. Thus, stiction between the magnetic recording medium and the magnetic head flying thereon for reproducing and recording magnetic recording information can be prevented and it is possible to solve the problem that the magnetic head is crushed easily. Further, since the convex shapes are formed out of a non-magnetic material, recording/reproducing can be performed without problem of noise at the time of recording/reproducing, for example, compared with the case where the convex shapes are formed out of a material containing a magnetic material or the like.

In a magnetic recording medium according to the invention, each of the convex shapes is a mountain-like shape in which an upper portion is smaller in width than a lower portion thereof. According to the invention, due to the mountain-like convex shapes, the upper surface width of each convex shape (that is, the height-direction upper end portion width of each convex shape) becomes so small that the contact area with the magnetic head can be made smaller. As a result, the effect of suppressing stiction between the magnetic recording medium and the magnetic head can be further enhanced.

In a magnetic recording medium according to the invention, the convex shapes on the magnetic recording layer are made of at least the same material as the non-magnetic layer. According to the invention, since the convex shapes on the magnetic recording layer are made of at least the same material as the non-magnetic layer, the convex shapes are produced easily, while stiction with the magnetic head is prevented so that the problem of crush caused by the stiction can be solved in the same manner as in the aforementioned configurations. Further, the problem of noise at the time of recording/reproducing can be prevented.

In a magnetic recording medium according to the invention, the convex shapes on the non-magnetic layer are made of at least the same material as the non-magnetic layer. According to the invention, the convex shapes can be produced easily and effect similar to that in the aforementioned description can be exerted.

In the magnetic recording medium according to the invention, when the convex shapes on the non-magnetic layer are made of at least the same material as the non-magnetic layer, it is preferable that (1) the height-direction upper end position of each convex shape is higher than the thickness-direction upper surface position on the magnetic recording layer, or (2) the height-direction upper end position of each convex shape is substantially on the same level as the thickness-direction upper surface position on the magnetic recording layer. According to the invention, due to small convex shapes formed on the non-magnetic layer in the mode (1) or (2), effect and operation similar to those in the aforementioned description can be exerted. That is, according to the magnetic recording medium having any one of these modes, the increase of frictional resistance between the magnetic recording medium and the magnetic head flying thereon in intermittent contact therewith is suppressed so that the magnetic head can be prevented from being stuck onto the magnetic recording medium. Thus, the magnetic head can be prevented from being crushed on the magnetic recording medium due to the stiction, so that a hard disk drive or the like can be driven stably.

In a magnetic recording medium according to the invention, each of the convex shapes is formed near a boundary portion of each element of the non-magnetic layer with an element of the magnetic recording layer adjacent to the non-magnetic layer element. Also in the invention, due to the convex shapes formed near the boundary portion of each element of the non-magnetic layer with an element of the magnetic recording layer adjacent to the non-magnetic layer element, effect similar to that in the aforementioned description can be exerted.

In a magnetic recording medium according to the invention, height of each of the convex shapes is not smaller than 0.2 nm and not larger than 2 nm. According to the invention, due to the convex shapes whose height is not smaller than 0.2 nm and not larger than 2 nm, stiction between the magnetic recording medium and the magnetic head can be prevented while the flying fluctuation of the magnetic head can be suppressed.

In a magnetic recording medium according to the invention, boundary portions between the magnetic recording layer and the non-magnetic layer have groove-like shapes. According to the invention, due to the groove shapes belonging to the boundary portions between the magnetic recording layer and the non-magnetic layer, the contact area between the magnetic recording medium and the magnetic head thereon is substantially reduced so that the increase of frictional fluctuation between the magnetic head and the magnetic recording medium can be suppressed.

In a magnetic recording medium according to the invention, the sum of height of each of the convex shapes and groove depth of each of the groove-like shapes is not smaller than 0.2 nm, and the convex shape height is not larger than 2 nm. The invention is advantageous for preventing the magnetic head from being stuck onto the magnetic recording medium because the sum of height of each convex shape and groove depth of each groove-like shape is not smaller than 0.2 nm. In addition, due to the height of each convex shape not larger than 2.0 nm, flying of the magnetic head flying on the magnetic recording medium can be stabilized.

Incidentally, in the specification, "a magnetic recording layer formed with a predetermined concavo-convex pattern on a disk substrate" implies a magnetic recording layer divided into a large number of recording elements with a predetermined pattern on a disk substrate, a magnetic recording layer partially divided but partially connected, a magnetic recording layer such as a spiral magnetic recording layer formed continuously in a part of a substrate, and a continuous magnetic recording layer having a concavo-convex pattern in which both convex portions and concave portions are formed.

As described above, according to a magnetic recording medium according to the present invention, due to the existence of the small convex shapes formed on the magnetic recording layer or the non-magnetic layer, the contact area between the magnetic recording medium and the magnetic head thereon is reduced so that the increase of the frictional resistance between the magnetic head and the magnetic recording medium can be suppressed. Thus, stiction between the magnetic recording medium and the magnetic head flying thereon for reproducing/recording magnetic recording information can be prevented. As a result, it is possible to solve the problem that the magnetic head is crushed due to the stiction. Recently, such an effect is effective particularly in a hard disk drive or the like in which the flying height of a magnetic head becomes low to be 10 nm or lower with increase in areal density. Thus, the hard disk drive or the like can be driven stably.

In addition, according to the magnetic recording medium according to the invention, the convex shapes are formed out of a non-magnetic material. Thus, for example, compared with the case where the convex shapes are formed out of a material containing a magnetic material, recording/reproducing can be performed without problem of noise at the time of recording/reproducing, while the convex shapes can be produced easily.

DETAILED DESCRIPTION OF THE PREFERRED EMBODIMENTS

Figure 1:
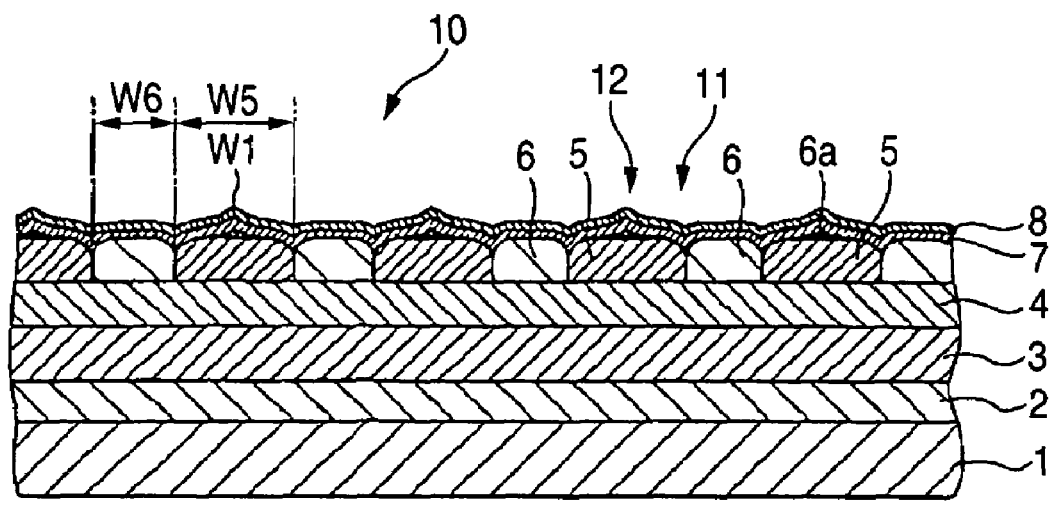
FIG. 1 is a schematic sectional view showing a first embodiment of a magnetic recording medium according to the invention.

Magnetic recording media according to the invention will be described in detail below. FIGS. 1-4 and 5A-5C are schematic sectional views showing examples of magnetic recording media according to the invention respectively.

(Magnetic Recording Medium)

Magnetic recording media according to the invention include hard disks, floppy (registered trademark) disks, magnetic tapes, etc. using only magnetism for recording and reproducing information. However, the magnetic recording media according to the invention are not limited to those media, but also include magneto-optical recording media such as MO (Magnet Optical) disks using both magnetism and light, and thermally assisted recording media using both magnetism and heat.

As shown in FIGS. 1-4 and 5A-5C, a typical magnetic recording medium according to the invention is a perpendicular recording type magnetic recording medium having a soft magnetic layer. The magnetic recording medium includes at least a disk substrate 1, a magnetic recording layer 5 formed with a predetermined concavo-convex pattern on the disk substrate 1, and a non-magnetic layer 6 formed in concave portions of the concavo-convex pattern. More specifically, for example, an undercoat layer 2, a soft magnetic layer 3 and an orientation layer 4 are laminated onto the disk substrate 1 in turn. Further on the orientation layer 4, a magnetic recording layer 5 is formed with a predetermined concavo-convex pattern, and a non-magnetic layer 6 is formed in concave portions of the concavo-convex pattern. Further a protective film 7 and a lubricating film 8 are formed to cover the magnetic recording layer 5 and the non-magnetic layer 6.

The magnetic recording medium according to the invention having such a laminated structure is characterized in that convex shapes 12, 22, 32, 42, 52 made of a non-magnetic material are formed on the magnetic recording layer 5 or the non-magnetic layer 6, and width (W1 or W2) of the upper surface of each convex shape is smaller than width (W5) of each convex portion of the concavo-convex pattern of the magnetic recording layer 5 or width (W6) of each concave portion where the non-magnetic layer 6 is formed (as will described in detail later with reference to FIGS. 11A-11E).

The magnetic recording medium according to the invention may be a magnetic recording medium (called a PERM type) in which a laminated substrate having an undercoat layer, a soft magnetic layer and an orientation layer laminated on a disk substrate in turn includes concaves and convexes, and a magnetic recording layer is formed as a film along the concaves and convexes. The following description will be made chiefly about a perpendicular recording type magnetic recording medium having a soft magnetic layer. However, the magnetic recording medium according to the invention may be a longitudinal recording type magnetic recording medium, or may be a PERM type magnetic recording medium in which a magnetic recording layer is formed as a film along concaves and convexes of a concavo-convex pattern.

First, description will be made about each layer constituting the magnetic recording medium.

It is desired that the disk substrate 1 is extremely smooth and have no undulation or the like. Thus, a magnetic head flying on the magnetic recording medium due to an air flow can fly in low height. A glass substrate, an NiP-plated Al—Mg alloy substrate or the like is preferably used as the disk substrate 1. Particularly, a glass substrate lower in surface roughness and hence high in surface smoothness is available easily and also superior in shock resistance. Therefore, the glass substrate 1 is preferably used in a small-size magnetic recording medium.

The undercoat layer 2 is provided for controlling the orientation of the soft magnetic layer 3 formed thereon, and so on. The soft magnetic layer 3 is provided for forming a magnetic circuit between the magnetic head and the magnetic recording medium, and so on. The orientation layer 4 is provided for controlling the orientation of the magnetic recording layer 5 formed thereon, and so on.

The magnetic recording layer 5 is provided with a predetermined pattern as a magnetic recording layer in a hard disk drive or the like. For example, in a discrete track type magnetic recording medium, in each data track region constituting the magnetic recording medium, a magnetic recording layer is formed so that elements thereof are arranged at very small intervals in the radial direction of tracks by a concentric pattern in order to record/reproduce magnetic recording information. On the other hand, in each servo pattern region constituting the magnetic recording medium, the magnetic recording layer is formed as a pattern to be used as reference of tracking control for making the magnetic head track on a desired data track. In addition, for example, in a discrete bit type magnetic recording medium, in each data track region constituting the magnetic recording medium, a magnetic recording layer is formed so that elements thereof are arranged at very small intervals in the circumferential direction and the radial direction of tracks by a dot pattern. On the other hand, in each servo pattern region constituting the magnetic recording medium, the magnetic recording layer is formed with a pattern corresponding to predetermined servo information or the like.

Preferred examples of materials for forming the magnetic recording layer 5 include Co—Cr-based polygenetic alloys such as CoCrTa, CoCrPt, CoCrPtTa, etc. The magnetic recording layer 5 is formed to be 5-30 nm in thickness by a film formation method such as a sputtering method, and an etching method. In each data track region, a magnetic recording layer pattern formed concentrically (which means a pattern of elements formed for magnetic recoding in the magnetic recording layer 5, and which may be also referred to as "magnetic recording layer pattern" or "track pattern") is formed, for example, to be 5-300 nm in pattern width and 10-500 nm in pattern pitch, while in each servo pattern region a magnetic recording layer pattern having various forms is formed, for example, to be 15-1,000 nm in pattern width and 30-2,000 nm in pattern pitch.

The non-magnetic layer 6 is a layer formed in each concave portion of the concavo-convex pattern formed on the disk substrate. Examples of non-magnetic materials for forming the non-magnetic layer 6 include $SiO_2$ (silicon dioxide), In (indium), ITO (tin-doped indium oxide), $Al_2O_3$, TiN, TaSi alloys, Ta, MgO, SiC, TiC, etc. The non-magnetic layer 6 is formed to be, for example, 5-30 nm thick by a film formation method such as a sputtering method.

According to the invention, it is preferable to select one or more compounds of oxides ($SiO_2$, ITO, $Al_2O_3$, MgO, etc.), nitrides (TiN etc.) and carbides (SiC, TiC, etc.) from the aforementioned various non-magnetic materials. These compounds are excellent in chemical stability in themselves and difficult to allow corrosion or the like to occur, for example, due to contact with the magnetic recording layer 5 having a metal component. Thus, it is possible to provide magnetic recording media excellent in chemical stability. According to the invention, particularly a non-magnetic material having $SiO_2$ as its primary component is preferably used. $SiO_2$ is processed by etching so easily that the convex shapes can be controlled easily by etching. In addition, $SiO_2$ is superior in adhesion to the magnetic recording layer 5 and also has an effect that it can form the non-magnetic layer 6 suppressed in crystal grain growth.

Alternatively, non-magnetic materials which are materials having an amorphous structure or microcrystalline materials may be used preferably as the non-magnetic layer 6. When the non-magnetic layer 6 is formed out of a crystalline material, etching will progress along grain boundaries belonging to the crystalline material at the time of etching the formed non-magnetic layer 6 so that the surface roughness of the etched surface will deteriorate. However, the phenomenon that the surface roughness deteriorates can be suppressed by use of a material having an amorphous structure or a microcrystalline material having grain boundaries substantially counting for nothing. Thus, it is possible to well control the height, width, periodicity, etc. of each convex shape made of the non-magnetic material. Specific examples of non-magnetic materials which are materials having an amorphous structure or microcrystalline materials include C, Si, $SiO_2$, $Al_2O_3$, TaSi alloys, TbFeCo alloys, CoZr alloys, etc. The non-magnetic layer 6 is formed to be, for example, 5-30 nm thick by a film formation method such as a sputtering method. Incidentally, the microcrystalline materials designate materials having no crystalline peak in X-ray diffraction.

The protective layer 7 is provided for protecting the surface of the magnetic recording medium so as to secure the sliding durability thereof in cooperation with the lubricating layer 8 which will be described later. Particularly, the protective layer 7 is provided for preventing the magnetic recording medium from being damaged at the time of contact with the magnetic head. Examples of materials for forming the protective layer 7 include a hard carbon film called diamond-like carbon (hereinafer-referred to as "DLC"), zirconium oxide ($ZrO_2$), silicon dioxide ($SiO_2$), etc. The protective layer 7 is formed to be 1-5 nm thick by a film formation method such as a CVD (Chemical Vapor Deposition) method or a sputtering method. Incidentally, the DLC is an amorphous structure film having carbon as its primary component, and it is a carbonaceous material showing hardness of about 200-8,000 $kgf/mM^2$ by Vickers hardness measurement.

The lubricating layer 8 is provided for protecting the surface of the magnetic recording medium so as to secure the sliding durability thereof in cooperation with the aforementioned protective layer 7. Preferred examples of materials for forming the lubricating layer 8 include liquid fluorine-based compounds such as perfluoropolyether (PFPE). The lubricating layer 8 is formed to be 1-2 nm thick by a film forming method such as a dipping method.

Next, magnetic recording media according to the invention will be described along its specific embodiments shown in FIGS. 1-4 and 5A-5C.

Figure 2:
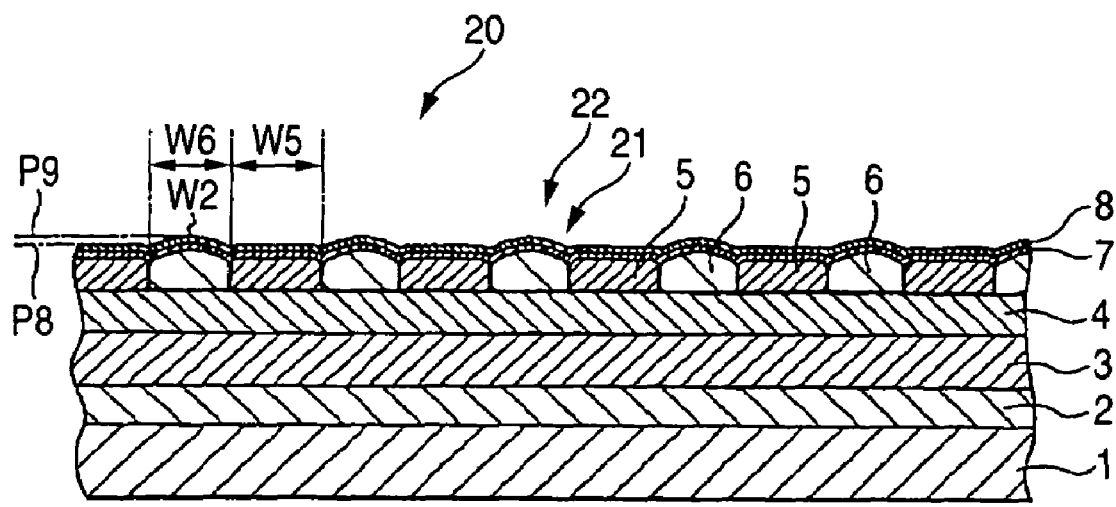
FIG. 2 is a schematic sectional view showing a second embodiment of a magnetic recording medium according to the invention.
Figure 3:
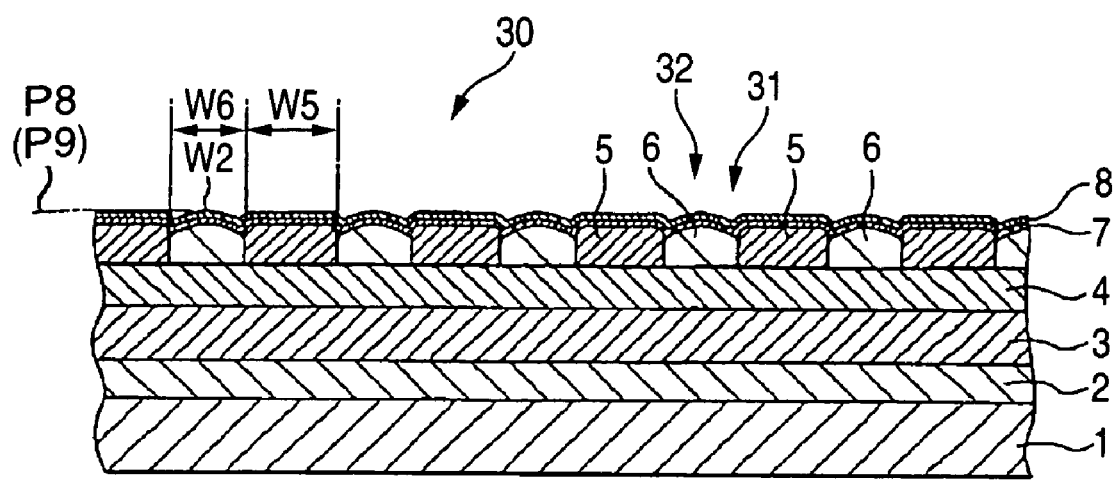
FIG. 3 is a schematic sectional view showing a third embodiment of a magnetic recording medium according to the invention.

FIGS. 1-3 are schematic sectional views showing examples of magnetic recording media according to the first to third embodiments. In each of magnetic recording media 10, 20 and 30 according to the first to third embodiments, an undercoat layer 2, a soft magnetic layer 3 and an orientation layer 4 are laminated onto a disk substrate 1 in turn. Further on the orientation layer 4, a magnetic recording layer 5 is formed with a predetermined concavo-convex pattern, and a non-magnetic layer 6 is formed in concave portions of the concavo-convex pattern. Further, a protective film 7 and a lubricating film 8 are formed to cover the magnetic recording layer 5 and the non-magnetic layer 6. The magnetic recording medium 10, 20, 30 is characterized in that convex shapes made of a non-magnetic material are formed on the magnetic recording layer 5 or the non-magnetic layer 6, and width (W1 or W2) of the upper surface of each convex shape is smaller than width (W5) of each convex portion of the concavo-convex pattern of the magnetic recording layer 5 or width (W6) of each concave portion where the non-magnetic layer 6 is formed. According to each of the magnetic recording media 10, 20 and 30 according to the first to third embodiments, the contact area between the magnetic recoding medium and a magnetic head in intermittent contact with the magnetic recording medium can be reduced due to the existence of the small convex shapes each having the aforementioned upper surface width. Thus, increase in frictional resistance between the magnetic head and the magnetic recording medium can be suppressed.

Specifically, as shown in FIG. 1, the magnetic recording medium 10 according to the first embodiment is formed so that the width W1 of the upper surface of each convex shape 12 on the magnetic recording layer 5 is smaller than the width W5 of each convex portion of the magnetic recording layer 5, and the convex shape 12 is formed out of a non-magnetic material 6a. The non-magnetic material 6a may be the same as or different from the non-magnetic material forming the non-magnetic layer 6 formed in each concave portion of the concavo-convex pattern. When the non-magnetic material 6a is the same as the non-magnetic material forming the non-magnetic layer 6, there is an advantage that the convex shapes are easy to produce.

Here, the shape of the magnetic recording medium according to the invention will be described in detail. FIGS. 11A-11E are explanatory views of a convex shape and a groove shape formed in the magnetic recording medium according to the invention.

Figure 11A:
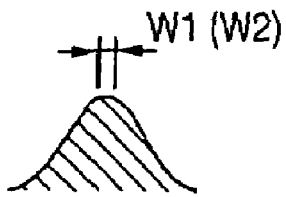
FIGS. 11A-11E are explanatory views of a convex shape and a groove shape formed in a magnetic recording medium according to the invention.
Figure 11B:
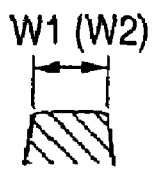

In the invention, the width (W1, W2) of the upper surface of each convex shape is defined as width of a height-direction upper end portion of the convex shape as shown in FIGS. 11A and 11B. As shown in FIG. 11A, the upper surface of the convex shape may be not flat. In such a case, the width of the upper surface of the convex shape is substantially zero. On the other hand, when the upper surface of the convex shape has a flat surface as shown in FIG. 11B, the width of the upper surface of the convex shape is equal to the width of the flat surface. Even when the convex shape has such a flat surface, the width W1, W2 of the upper surface of the convex shape is preferably not larger than ⅓ of the width W5 of each convex portion of the concavo-convex pattern of the magnetic recording layer 5 or the width W6 of each concave portion where the non-magnetic layer 6 is formed.

Figure 11C:
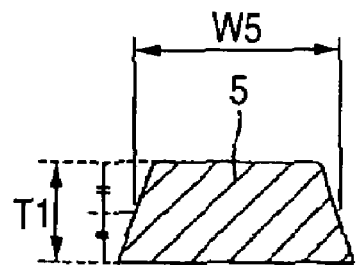

The width W5 of each convex portion of the concavo-convex pattern of the magnetic recording layer 5 means the width of each convex portion of the concavo-convex pattern formed as a portion for recording magnetic recording information in the magnetic recording medium as shown in FIG. 11C. In the invention, the width W5 is defined as width in a thickness-direction center portion of the magnetic recording layer 5 forming the convex portion of the concavo-convex pattern. The thickness-direction center portion of the magnetic recording layer means a position half as high as thickness T1 of the magnetic recording layer 5. As shown in FIG. 11C, the thickness T1 of the magnetic recording layer 5 is not always equal to height T2 (thickness) of the convex portion of the concavo-convex pattern. For example, in a discrete track type magnetic recording medium, the width W5 of each convex portion of the concavo-convex pattern of the magnetic recording layer 5 defined thus corresponds to the track width in the radial direction of the concentric track pattern in each data track region, and corresponds to the width of a pattern serving as reference of tracking control in each servo pattern region. On the other hand, for example, in a discrete bit type magnetic recording medium, the width W5 corresponds to the width of a dotted pattern in each data track region, and corresponds to the width of a pattern corresponding to predetermined servo information or the like in each servo pattern region.

Figure 11D:
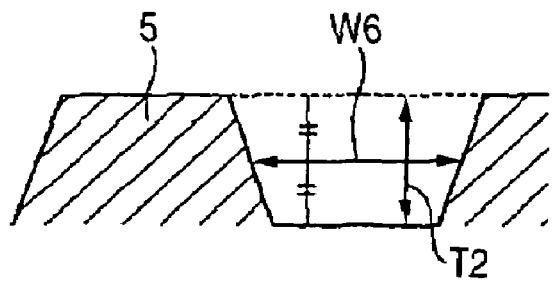

On the other hand, the width W6 of each concave portion of the concavo-convex pattern means the width of each concave portion other than the convex portions serving to record magnetic recording information in the magnetic recording medium as shown in FIG. 11D, that is, the width of each concave portion where the non-magnetic layer 6 is formed. In the invention, the width of the concave portion is defined as the width W6 in the depth-direction center portion of the concave portion of the concavo-convex pattern.

Figure 11E:
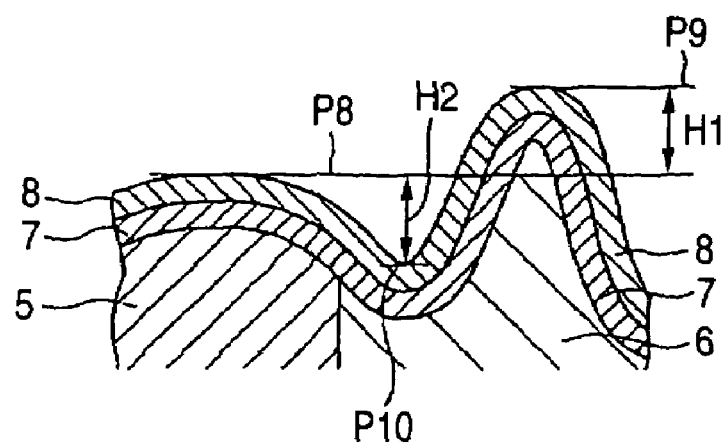

In the invention, the convex shapes are formed on the magnetic recording layer 5 or the non-magnetic layer 6. The height H1 of each convex shape is defined as height (P9-P8) from an upper surface position P8 of the lubricating layer 8 formed on the magnetic recording layer 5 to an upper end position P9 of the convex shape as shown in FIG. 11E. In the invention, groove shapes may be formed in the surface of the magnetic recording medium or may be not formed in the surface of the magnetic recording medium. When the groove shapes are formed, the groove depth H2 of each groove shape is defined as depth (P8-P10) from the upper surface position P8 of the lubricating layer 8 formed on the magnetic recording layer 5 to a lower end position P10 of the groove shape as shown in FIG. 11E.

The "upper end position" herein means a position of a height-direction top portion of the convex shape, and the "lower end position" means a position of a depth-direction bottom portion of the groove shape. When the magnetic recording layer 5 or the non-magnetic layer 6 is provided with convex shapes, the "upper surface position" herein means a position of a thickness-direction upper surface on the magnetic recording layer 5 or the non-magnetic layer 6 in a portion where the convex shapes are not provided. When the magnetic recording layer 5 or the non-magnetic layer 6 is not provided with convex shapes, the "upper surface position" means a position of a thickness-direction upper surface on the magnetic recording layer 5 or the non-magnetic layer 6. The phrase "on the magnetic recording layer 5" or "on the non-magnetic layer 6" means a thickness-direction upper portion when the protective layer 7 or the lubricating layer 8 is formed on the magnetic recording layer 5 or the non-magnetic layer 6.

For example, the mountain-like shape as a preferred form of the convex shape means a shape in which an upper portion thereof is smaller in width than a lower portion thereof as shown in FIG. 11A. Typically, the mountain-like shape is a shape having skirts of the mountain. Incidentally, only if the mountain-like shape has such a shape, the mountain-like shape may be a projection whose upper end is acute or a projection whose upper end is slightly rounded.

The mode of each convex shape, the height of each convex shape, the depth of each groove shape, etc. as described above can be expressed by results measured by an atomic force microscope.

Next, second to fifth embodiments will be described in turn.

In each of the magnetic recording media 20 and 30 according to the second and third embodiments, as shown in FIGS. 2 and 3, each convex shape 22, 32 on the non-magnetic layer 6 is formed to have an upper surface width W2 smaller than the width W6 of each concave portion of the concavo-convex pattern where the non-magnetic layer 6 is formed, and the convex shape 22, 32 is formed out of a non-magnetic material. Also in this case, the non-magnetic material may be the same as or different from the non-magnetic material forming the non-magnetic layer 6 formed in each concave portion of the concavo-convex pattern. When the convex shapes 22, 32 are formed out of the same non-magnetic material as the non-magnetic material forming the non-magnetic layer 6, there is an advantage that the convex shapes are easy to produce.

More in particularly, the magnetic recording medium 20 according to the second embodiment is formed so that the height-direction upper end position P9 of each convex shape 22 on the non-magnetic layer 6 is higher than the thickness-direction upper surface position P8 on the magnetic recording layer 5 as shown in FIG. 2. In this event, it is desired that the difference between the height-direction upper end position P9 of the convex shape 22 and the thickness-direction upper surface position P8 on the magnetic recording layer 5 (that is, the height of the convex shape) is not larger than 2 nm. When the difference between the both (that is, the height of the convex shape) is larger than 2 nm, there is a problem that the fluctuation in flying height of the magnetic head flying on the magnetic recording medium is easy to increase. Incidentally, the height-direction upper end position P9 of the convex shape 22 may be substantially on the same level with the thickness-direction upper surface position P8 on the magnetic recording layer 5 as will be described later in the third embodiment.

That is, as shown in FIG. 3, the magnetic recording medium 30 according to the third embodiment is formed so that the height-direction upper end position P9 of each convex shape 32 on the non-magnetic layer 6 is substantially on the same level with the thickness-direction upper surface position P8 on the magnetic recording layer 5. Incidentally, in this specification, the phrase "substantially on the same level" is used as a term including the case where both the height-direction positions P8 and P9 are on the same level and the case where both the height-direction positions P8 and P9 are substantially on the same level.

Particularly in the third embodiment, the convex shapes 32 on the non-magnetic layer 6 results from the groove shapes 31 belonging to boundary portions between the magnetic recording layer 5 and the non-magnetic layer 6. In this event, the height-direction upper end position P9 of each convex shape 32 on the non-magnetic layer 6 may be lower than the thickness-direction upper surface position P8 on the magnetic recording layer 5. Also in this case, due to the groove shapes 31 belonging to the boundary portions, the contact area of the magnetic head onto the magnetic recording medium is substantially reduced so that the increase of frictional resistance between the magnetic head and the magnetic recording medium can be suppressed.

In the first or second embodiment, as shown in FIG. 1 or 2, each boundary portion between the magnetic recording layer 5 and the non-magnetic layer 6 in the magnetic recording medium 10, 20 may include a groove shape 11, 21. Alternatively, each boundary portion between the magnetic recording layer 5 and the non-magnetic layer 6 may include no groove shape, for example, as in the magnetic recording medium 40 according to the fourth embodiment shown in FIG. 4. When the groove shape 11, 21, 31 exists in the boundary portion, it is preferable that the groove depth of the groove shape is, for example, not larger than 2 nm. In each magnetic recording medium 10, 20, 30 having such groove shapes 11, 21, 31 can have operation and effect similar to those based on the aforementioned convex shapes. Thus, the contact area between the magnetic recording medium and the magnetic head is reduced so that the increase of the frictional resistance between the both can be suppressed. The method for forming such groove shapes is not limited especially. For example, the groove shapes are formed by ion beam etching with an ion beam from a direction perpendicular to the surface of the magnetic recording medium, as will be described later.

Figure 4:
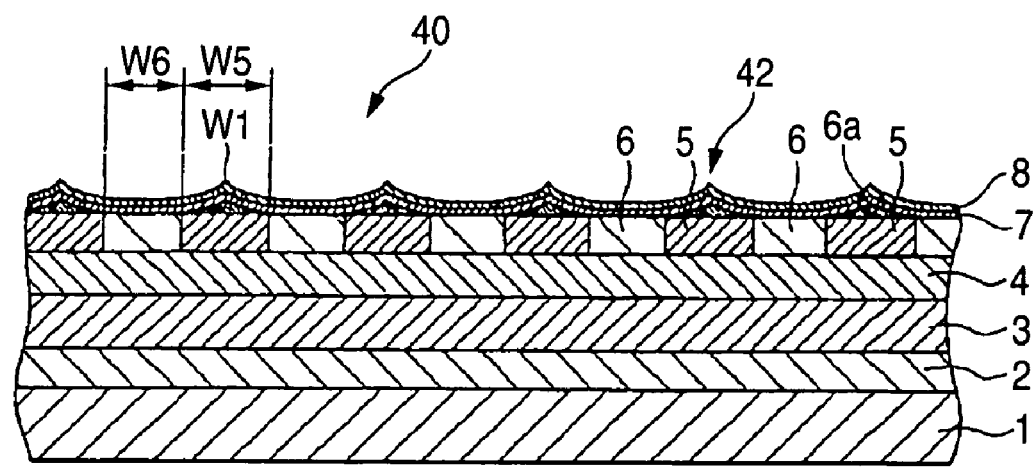
FIG. 4 is a schematic sectional view showing a fourth embodiment of a magnetic recording medium according to the invention.

FIG. 4 is a schematic sectional view showing an example of a magnetic recording medium according to the fourth embodiment. In the magnetic recording medium 40 according to the fourth embodiment, the convex shapes 42 on the magnetic recording layer 5 is formed to have an upper surface width W1 smaller than the width W5 of each convex portion of the magnetic recording layer 5, and the convex shapes 42 are formed out of a non-magnetic layer 6a. Also in this case, the non-magnetic material 6a may be the same as or different from the non-magnetic material forming the non-magnetic layer 6 formed in each concave portion of the concavo-convex pattern. When the non-magnetic material 6a is the same as the non-magnetic material forming the non-magnetic layer 6, there is an advantage that the convex shapes are easy to produce. In addition, in the magnetic recording medium 40, as described above, each boundary portion between the magnetic recording layer 5 and the non-magnetic layer 6 has no groove shape. Each convex shape 42 formed in the magnetic recording medium 40 is formed to have an upper surface width W1 in the same manner as that in the magnetic recording medium 10 according to the first embodiment.

Figure 5A:
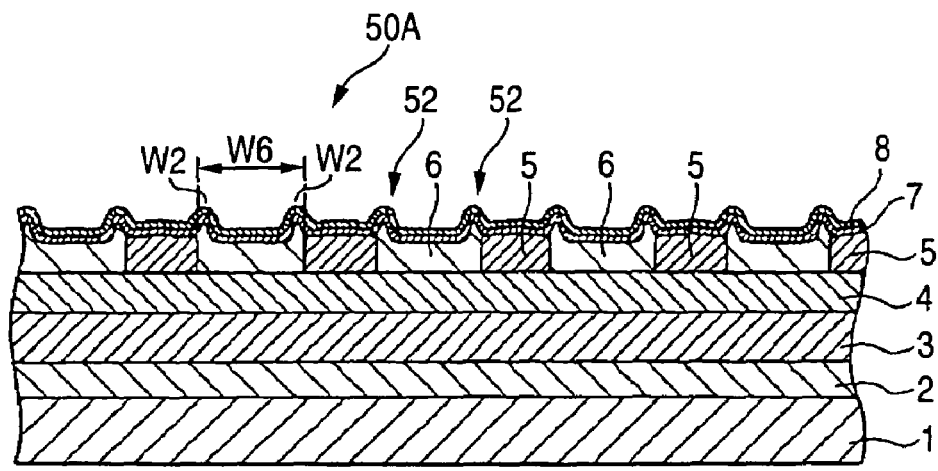
FIGS. 5A-5C are schematic sectional views showing a fifth embodiment of a magnetic recording medium according to the invention.
Figure 5B:
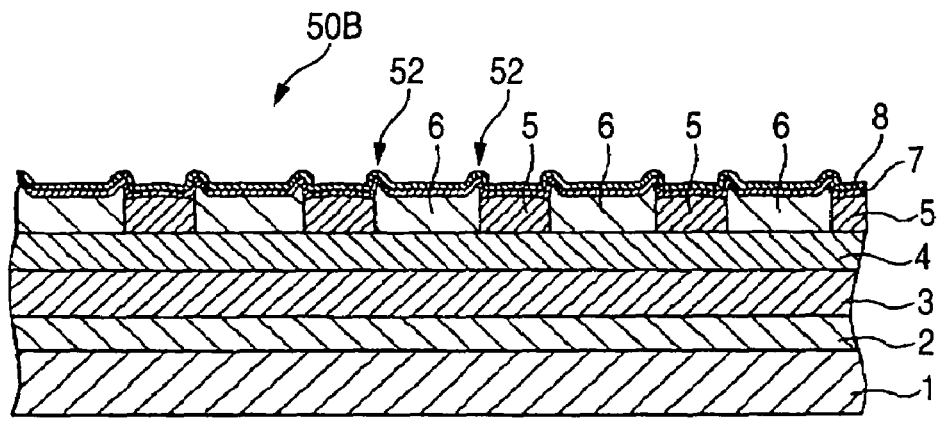
Figure 5C:
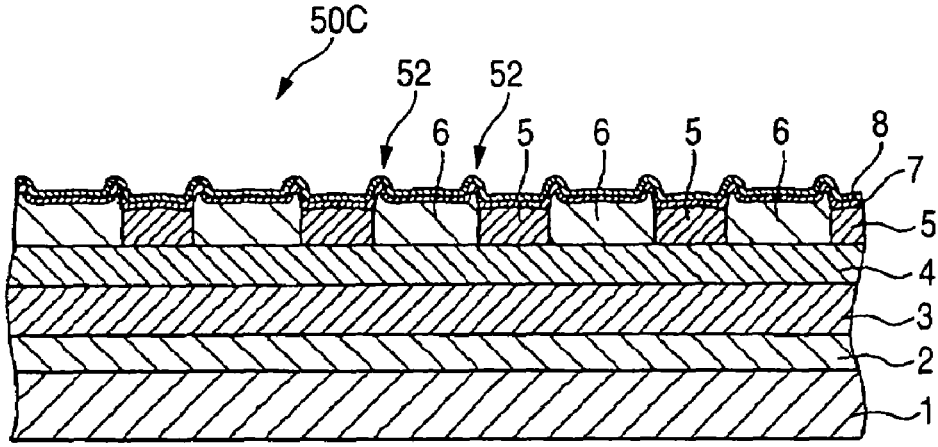

FIGS. 5A-5C are schematic sectional views showing examples of magnetic recording media according to the fifth embodiment. In each magnetic recording medium 50 according to the fifth embodiment, an undercoat layer 2, a soft magnetic layer 3 and an orientation layer 4 are laminated onto a disk substrate 1 in turn in the same manner as that according to any one of the first to fourth embodiments. Further on the orientation layer 4, a magnetic recording layer 5 is formed with a predetermined concavo-convex pattern, and a non-magnetic layer 6 is formed in concave portions of the concavo-convex pattern. Further a protective film 7 and a lubricating film 8 are formed to cover the magnetic recording layer 5 and the non-magnetic layer 6. In the magnetic recording medium, convex shapes 52 and 52 made of a non-magnetic material are formed on each non-magnetic layer element 6 so that the upper surface width W2 of each of the convex shapes 52 and 52 is smaller than the width W6 of the concave portion where the non-magnetic layer element 6 is formed. The fifth embodiment is characterized in that the convex shapes 52 and 52 formed on each non-magnetic layer element 6 are formed near boundary portions of the non-magnetic layer element 6 adjacent to magnetic recording layer elements 5 and 5. In the magnetic recording medium 50 according to the fifth embodiment, due to the existence of the two small convex shapes 52 and 52 formed on each non-magnetic layer element 6, the contact area between the magnetic recording medium and the magnetic head in intermittent contact with the magnetic recording medium can be reduced so that the increase of the frictional resistance between the magnetic head and the magnetic recording medium can be suppressed. Here, the phrase "near boundary portions" means positions within about 30% of the width (width W6 of the concave portion) of each non-magnetic layer element 6 from the edge portions of the magnetic recording layer elements 5 and 5 adjacent to the non-magnetic layer element 6 so as to put the non-magnetic layer element 6 therebetween, respectively.

Two small convex shapes 52 and 52 are formed in each non-magnetic layer element 6 in any one of the modes shown in FIGS. 5A-5C, but the upper surface position on each non-magnetic layer element 6 having the convex shapes 52 and 52 (the upper surface position of the non-magnetic layer element 6 means the upper surface position of the portion other then the convex shapes) with respect to the thickness-direction upper surface position on each magnetic recording layer element 5 differs from one mode to another. Specifically, in a magnetic recording medium 50A according to the mode shown in FIG. 5A, the upper surface position on each non-magnetic layer element 6 is lower than the upper surface position on each magnetic recording layer element 5. In a magnetic recording medium 50B according to the mode shown in FIG. 5B, the upper surface position on each non-magnetic layer element 6 is substantially as high as the upper surface position on each magnetic recording layer element 5. In a magnetic recording medium 50C according to the mode shown in FIG. 5C, the upper surface position on each non-magnetic layer element 6 is higher than the upper surface position on each magnetic recording layer element 5. In any one of the modes shown in FIGS. 5A-5C, similar operation and effect can be obtained.

As described above, in any one of the magnetic recording media according to the invention shown in FIGS. 1-4 and 5A-5C, small convex shapes made of a non-magnetic material are provided on a magnetic recording layer or a non-magnetic layer. Accordingly, due to the effect of the convex shapes, the contact area of a magnetic head on the magnetic recording medium is reduced so that the increase of frictional resistance between the magnetic head and the magnetic recording medium can be suppressed. As a result, it is possible to prevent stiction between the magnetic recording medium and the magnetic head flying thereon for reproducing and recording magnetic recording information.

In the invention, it is preferable that the height of each convex shape is 0.2-2 nm when no groove shape is provided in the surface of the magnetic recording medium. On the other hand, when groove shapes are provided in the surface of the magnetic recording medium, it is preferable that the sum of the height of each convex shape and the groove depth of each groove shape is not smaller than 0.2 nm, and the height of each convex shape is not larger than 2 nm. Accordingly, regardless of the existence of the groove shapes, it is preferable that the sum of the height of each convex shape and the groove depth of each groove shape is not smaller than 0.2 nm, and the height of each convex shape is not larger than 2 nm. When the sum of the height of each convex shape and the groove depth of each groove shape is smaller than 0.2 nm, the magnetic head may be crushed easily due to stiction between the magnetic recording medium and the magnetic head. On the other hand, when the height of each convex shape is larger than 2 nm, the magnetic head may be crushed easily by collision of the magnetic head with the magnetic recording medium due to increase in flying fluctuation of the magnetic head, or output fluctuation in recording or reproducing may increase.

In each of the magnetic recording media according to the aforementioned embodiments of the invention, the undercoat layer 2, the soft magnetic layer 3 and the orientation layer 4 are formed under the magnetic recording layer 5. The invention is not limited to such a configuration. The configuration of layers under the magnetic recording layer 5 can be changed suitably in accordance with the kind of magnetic recording medium. For example, one or two layers of the undercoat layer 2, the soft magnetic layer 3 and the orientation layer 4 may be omitted, or a continuous recording layer may be formed directly on a substrate.

In each of the aforementioned embodiments, the magnetic recording medium according to the invention is a perpendicular recording discrete track type magnetic disk in which the magnetic recording layer is divided at minute intervals in the radial direction of tracks. However, the invention is not limited to such a configuration. The invention is also applicable to a magnetic disk in which a magnetic recording layer is divided at minute intervals in the circumferential direction (sector direction) of tracks, a magnetic disk in which a magnetic recording layer is divided at minute intervals in both the radial direction and the circumferential direction of tracks, a PERM type magnetic disk having a magnetic recording layer with a continuous concavo-convex pattern, and a magnetic disk having a spiral magnetic recording layer. Incidentally, in a magnetic recording medium according to a mode in which the magnetic recording layer is absent from concave portions of the concavo-convex pattern, there is an effect that the problem of noise generated from the concave portions can be eliminated.

(Method for Manufacturing Magnetic Recording Medium)

Next, description will be made about an example of a method for manufacturing the aforementioned magnetic recording medium having convex shapes. FIGS. 6A-6H and 7A-7F are sectional mode views for explaining a manufacturing process of the magnetic recording medium according to the invention. Incidentally, the following manufacturing method is merely an example. Manufacturing the magnetic recording medium is not limited to the following method.

Figure 6A:
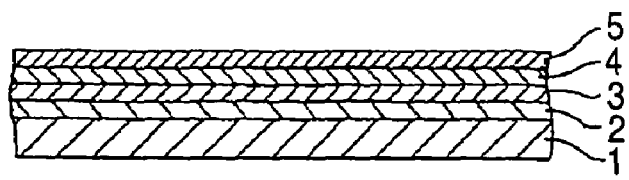
FIGS. 6A-6H are schematic sectional views showing a manufacturing process of a magnetic recording medium according to the invention.
Figure 6B:
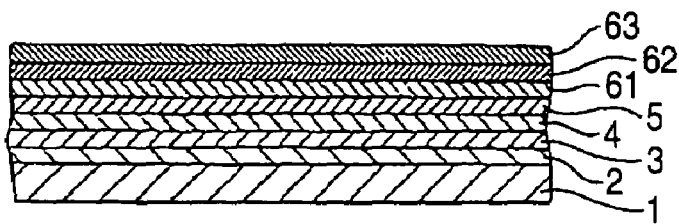
Figure 6C:
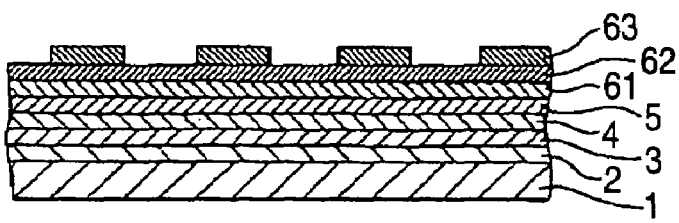
Figure 6D:
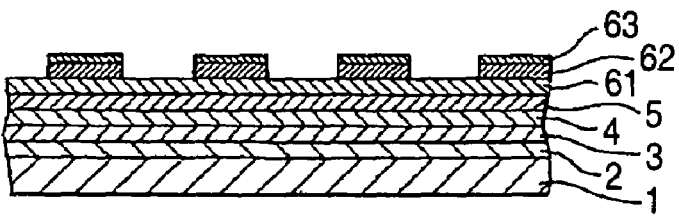
Figure 6E:
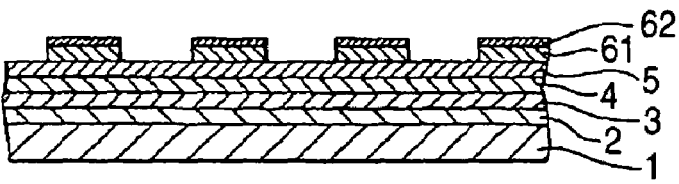

First, a disk substrate 1 is prepared, and an undercoat layer 2, a soft magnetic layer 3, an orientation layer 4 and a magnetic recording layer 5 are formed and laminated with predetermined thicknesses on the disk substrate 1 in that order, for example, by a sputtering method or the like (see FIG. 6A). A first mask layer 61 and a second mask layer 62 are formed and laminated on the magnetic recording layer 5 in that order, for example, by a sputtering method or the like, and a resist layer 63 is further laminated thereon, for example, by a dipping method or a spin coat method (see FIG. 6B). Here, for example, the first mask layer 61 is formed out of TiN, the second mask layer 62 is formed out of Ni, and the resist layer 63 is formed out of negative type resist (such as NBE22A (made by Sumitomo Chemical Co., Ltd.)).

Next, a predetermined concavo-convex pattern is transferred to the resist layer 63 by a nano-imprint method so as to form a resist pattern. After that, the resist layer at the bottom of each concave portion of the resist pattern is removed by an ashing method (see FIG. 6C). Alternatively, the resist pattern may be formed by a photolithographic method.

Next, the second mask layer 62 exposed from the bottom of each concave portion of the resist pattern is removed, for example, by ion beam etching using Ar (argon) gas. In this event, the resist layer 63 formed in regions other than the concave portions is also removed slightly (see FIG. 6D). After that, the first mask layer 61 at the bottom of each concave portion is removed, for example, by reactive ion etching using $SF_6$ (sulfur hexafluoride) gas (see FIG. 6E). Thus, the magnetic recording layer 5 is exposed from the bottom of each concave portion. Incidentally, in this event, the resist layer 63 formed in regions other than the concave portions is removed perfectly. On the other hand, the second mask layer 62 in regions other than the concave portions is removed partially, but a certain quantity thereof remains.

Figure 6F:
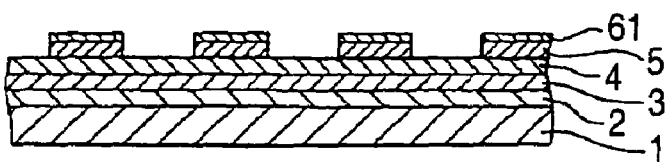

Next, the magnetic recording layer 5 exposed from the bottom of each concave portion is removed, for example, by reactive ion etching using CO gas and $NH_3$ gas as reactive gas (see FIG. 6F). Thus, the magnetic recording layer 5 is formed with a predetermined concavo-convex pattern. Incidentally, by this reactive ion etching, the second mask layer 62 in regions other than the concave portions of the concavo-convex pattern is removed perfectly, and the first mask layer 61 in regions other than the concave portions is also removed partially. A certain quantity of the first mask layer 61 remains on the magnetic recording layer 5.

Figure 6G:
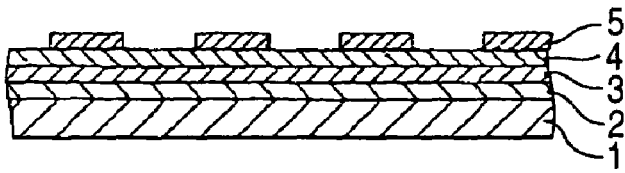
Figure 6H:
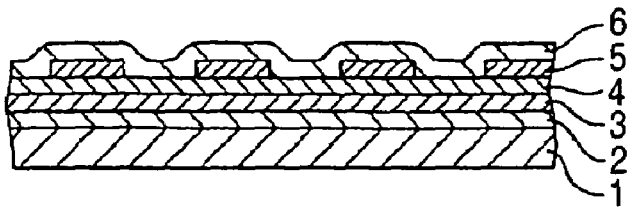

Next, the first mask layer 61 remaining on the magnetic recording layer 5 corresponding to the convex portions of the concavo-convex pattern is removed perfectly, for example, by reactive ion etching using $SF_6$ gas as reactive gas (see FIG. 6G). Thus, the magnetic recording layer 5 having a predetermined concavo-convex pattern is formed.

Residual reactive gas is removed by dry cleaning. After that, for example, a non-magnetic layer 6 made of $SiO_2$ is formed into a film by a sputtering method so as to be filled into the concave portions of the concavo-convex pattern located between magnetic recording layer elements 5 and 5 (see FIG. 6H). The non-magnetic layer 6 is not only filled into the concave portions of the concavo-convex pattern but also formed on the magnetic recording layer 5. When the non-magnetic layer 6 is formed in two steps, the surface of a to-be-processed body filmed therewith can be flattened. For example, a second layer of the non-magnetic layer is formed with bias power being applied to the surface of the to-be-processed body to be filmed with the non-magnetic layer.

Thus, the flatness of the upper surface of the formed non-magnetic layer can be improved.

Figure 7A:
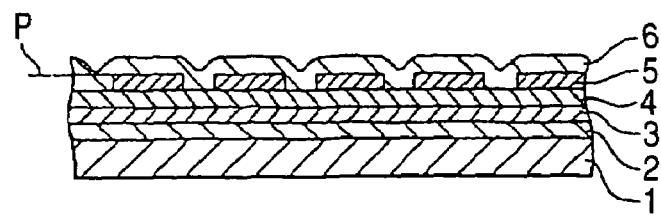
FIGS. 7A-7F are schematic sectional views showing a manufacturing process of a magnetic recording medium according to the first to fourth embodiments of the invention.

FIGS. 7A-7F are sectional mode views for explaining the process for manufacturing the magnetic recording medium according to the invention. Specifically, FIGS. 7A-7F are explanatory views showing an example of the steps of forming convex shapes in the to-be-processed body. FIG. 7A shows a mode of the to-be-processed body in which the non-magnetic layer 6 has been formed on the magnetic recording layer 5 formed with a predetermined concavo-convex pattern, while the non-magnetic layer 6 has been filled into concave portions of the concavo-convex pattern.

In the invention, in order to form the convex shapes in the to-be-processed body formed thus, the surface of the to-be-processed body is etched by ion beam etching using Ar gas. Thus, the non-magnetic layer 6 higher than the thickness-direction upper surface position P of the magnetic recording layer 5 is removed so that the surface of the to-be-processed body is flattened, while the convex shapes made of a non-magnetic material are formed on the magnetic recording layer 5.

Figure 7B:
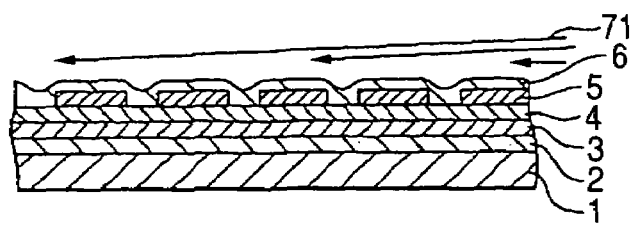
Figure 7C:
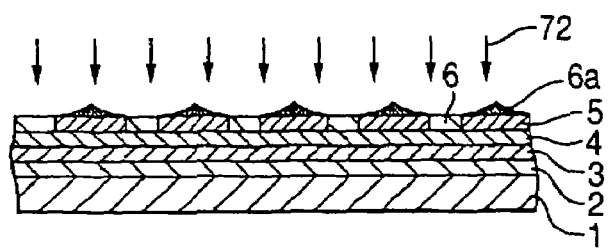
Figure 7D:
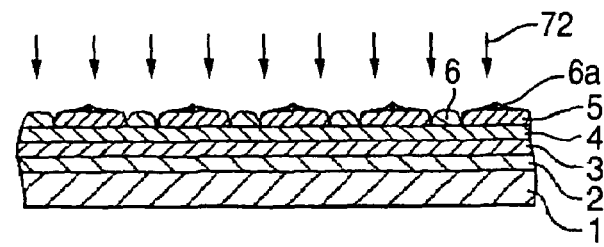
Figure 7E:
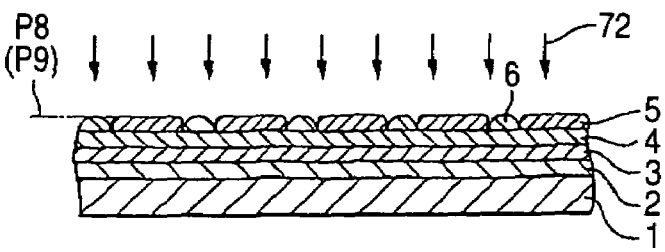
Figure 7F:
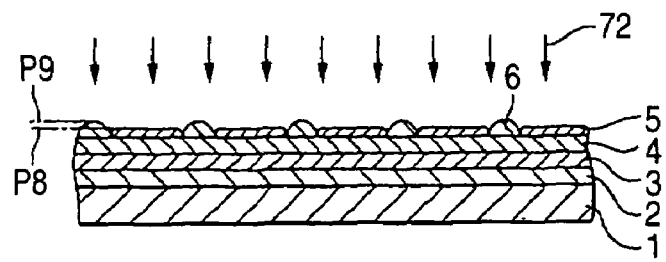

More specifically, as shown in FIG. 7B, the to-be-processed body is irradiated with an ion beam 71, for example, at an incident angle of 2°. Due to this ion beam etching, the surface of the non-magnetic layer 6 is flattened to some extent. After that, as shown in FIGS. 7C and 7D, the to-be-processed body is irradiated with an ion beam 72, for example, at an incident angle of 90°. Due to this ion beam etching, very small convex shapes can be formed out of the non-magnetic material 6a remaining on the magnetic recording layer 5. Further, after that, as shown in FIGS. 7E and 7F, the to-be-processed body is irradiated with the ion beam 72, for example, at an incident angle of 90°. Due to this ion beam etching, convex shapes made of the non-magnetic material can be formed on the non-magnetic layer 6.

More in detail, the magnetic recording medium shown in FIG. 7D corresponds to the magnetic recording medium 10 according to the first embodiment shown in FIG. 1. When the processing time of the ion beam etching in FIG. 7C is further elongated, groove shapes are formed in boundary portions between the magnetic recording layer 5 and the non-magnetic layer 6 while the convex shapes made of the non-magnetic material 6a are provided on the magnetic recording layer 5.

The magnetic recording medium shown in FIG. 7E corresponds to the magnetic recording medium 30 according to the third embodiment shown in FIG. 3. When the processing time of the ion beam etching in FIG. 7D is further elongated, the non-magnetic material 6a on the magnetic recording layer 5 is etched by the ion beam. Thus, a magnetic recording medium having a surface with no non-magnetic material on the magnetic recording layer 5 can be obtained. This magnetic recording medium is characterized in that convex shapes are formed on the non-magnetic layer 6, and the convex shapes are formed out of the same material as the non-magnetic material forming the non-magnetic layer 6, while the height-direction upper end position P9 of each convex shape is substantially on the same level as the thickness-direction upper surface position P8 on the magnetic recording layer 5 adjacent to the convex shape. Further, groove shapes are formed in boundary portions between the magnetic recording layer 5 and the non-magnetic layer 6. Incidentally, in order to simplify the description, the protective layer 7 or the lubricating layer 8 are not shown in FIGS. 7A-7F. However, the upper end position or the upper surface position is defined just as described above.

The magnetic recording medium shown in FIG. 7F corresponds to the magnetic recording medium 20 according to the second embodiment shown in FIG. 2. When the processing time of the ion beam etching in FIG. 7E is further elongated, a magnetic recording medium in which the magnetic recording layer 5 has been further etched by the ion beam can be obtained. This magnetic recording medium is characterized in that convex shapes made of a non-magnetic material are formed on the non-magnetic layer 6, while the height-direction upper end position P9 of each convex shape is higher than the thickness-direction upper surface position P8 on the magnetic recording layer 5 adjacent to the convex shape. Further, groove shapes are formed in boundary portions between the magnetic recording layer 5 and the non-magnetic layer 6.

In the aforementioned ion beam etching, the incident angle of the ion beam may be changed desirably so as to change the etching rate of the magnetic recording layer 5 and the etching rate of the non-magnetic layer 6 suitably. To manufacture the magnetic recording medium according to any one of the modes shown in FIGS. 7D-7F, ion beam etching is performed from a direction perpendicular to the film surface formed out of the magnetic recording layer 5 and the non-magnetic layer 6 (incidental angle 90°: perpendicular direction). Due to the ion beam etching from such a direction, the etching rate of the magnetic recording layer 5 can be made higher than the etching rate of $SiO_2$ as the non-magnetic layer 6. Thus, the magnetic recording layer 5 can be chiefly etched. As a result, when the processing time of the ion beam etching is set desirably, the magnetic recording media according to the modes shown in FIGS. 7D-7F can be manufactured accordingly.

The magnetic recording medium 40 according to the fourth embodiment shown in FIG. 4 is manufactured as follows. That is, for example, the to-be-processed body formed in the mode shown in FIG. 7A is irradiated with an ion beam 71 having an incident angle of 2° as shown in FIG. 7B. As shown in FIG. 4, the magnetic recording medium 40 manufactured by such ion beam etching has a structure in which convex shapes made of a non-magnetic material are provided on the magnetic recording layer 5, while no groove shape is provided.

When the incident angle of the ion beam is changed to change the etching rate of the magnetic recording layer 5 and the etching rate of $SiO_2$ as the non-magnetic layer 6, magnetic recording media according to the modes shown in FIGS. 5A-5C can be manufactured. For example, in an ion beam etching method using Ar gas, when the incident angle of an ion beam is tilted so that the ion beam comes to be parallel to the film surface, the etching rate of $SiO_2$ as the non-magnetic layer 6 can be made higher than the etching rate of the magnetic recording layer 5. Thus, the non-magnetic layer 6 can be mainly etched. By performing the ion beam etching while desirably changing not only the incident angle and the processing time of the ion beam but also the etching power, the pressure, the kind of gas, and the pressure with which the non-magnetic layer 6 is formed as a film, the magnetic recording media according to the modes shown in FIGS. 5A-5C can be manufactured accordingly.

Figure 8A:
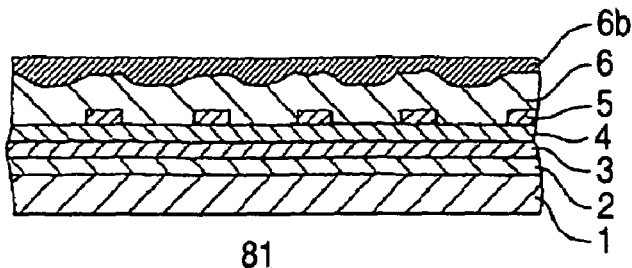
FIGS. 8A-8G are schematic sectional views showing a manufacturing process of a magnetic recording medium according to a fifth embodiment of the invention.

FIGS. 8A-8G are schematic sectional views showing an example of a manufacturing process of the magnetic recording media according to the fifth embodiment shown in FIGS. 5A-5C. FIG. 8A shows a magnetic recording medium in which non-magnetic layers 6 and 6b are formed in two steps on a magnetic recording layer 5 formed with a predetermined pattern, so that the surface of a to-be-processed body filmed with those layers is flattened. For example, the second non-magnetic layer 6b can be formed out of a negative type resist resin. As a result, the flatness of the upper surface of the non-magnetic layer 6b can be improved. FIG. 9 is a graph showing an example of the relationship between the incident angle of an ion beam on each layer of the magnetic recording layer 5, the first non-magnetic layer 6 made of $SiO_6$, and the second non-magnetic layer 6b made of the resist resin, and the etching rate of each layer. The manufacturing process in FIGS. 8A-8G will be described using a system having the relationship shown in FIG. 9.

Figure 8B:
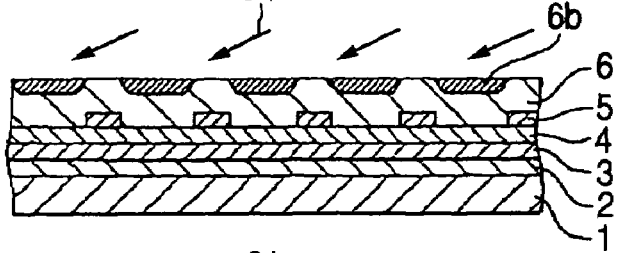
Figure 9:
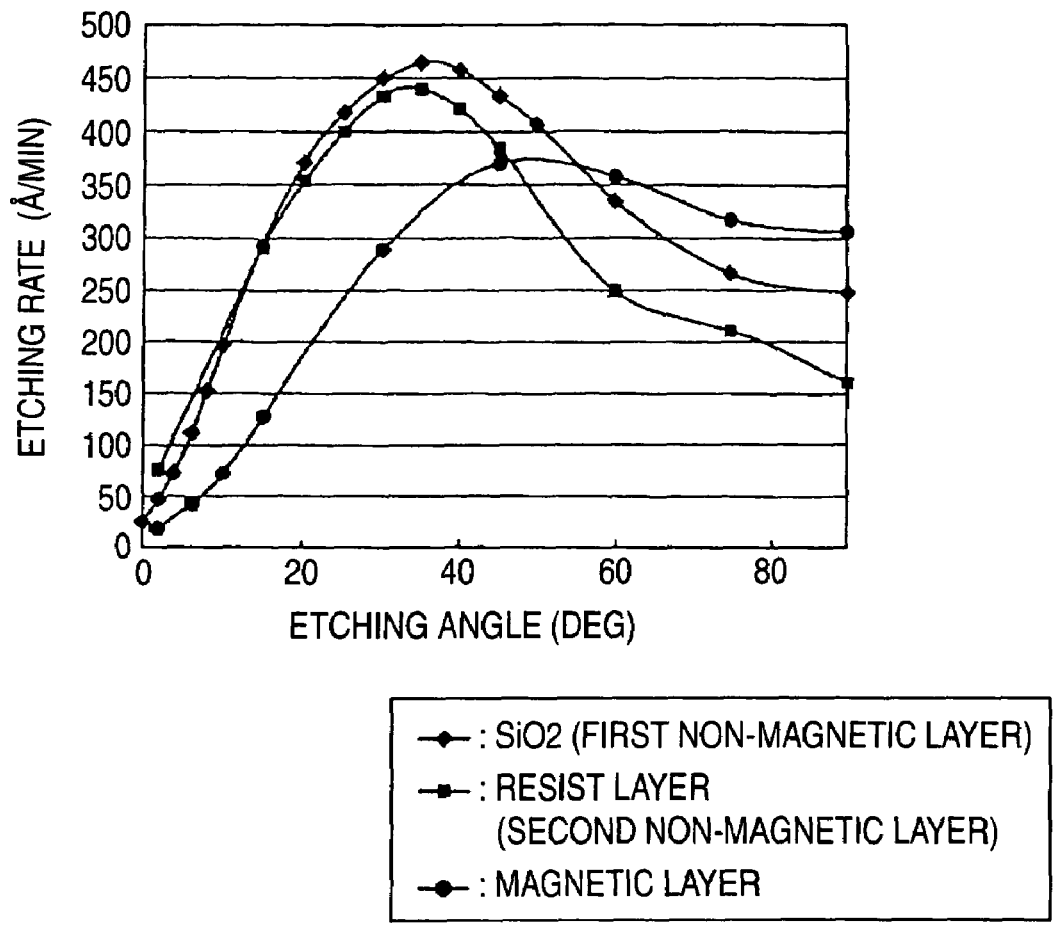
FIG. 9 is a graph showing an example of the relationship between the incident angle of an ion beam on each layer of a magnetic recording layer, a first non-magnetic layer and a second non-magnetic layer, and the etching rate of each layer.

First, as shown in FIG. 8B, the to-be-processed body is irradiated with an ion beam 81, for example, at an incident angle of 30°. Thus, ion beam etching is performed on the to-be-processed body. Due to this ion beam etching, the second non-magnetic layer 6b made of the resist resin is etched by the ion beam. The ion beam etching of the second non-magnetic layer 6b is continued till the first non-magnetic layer 6 appears.

Figure 8C:
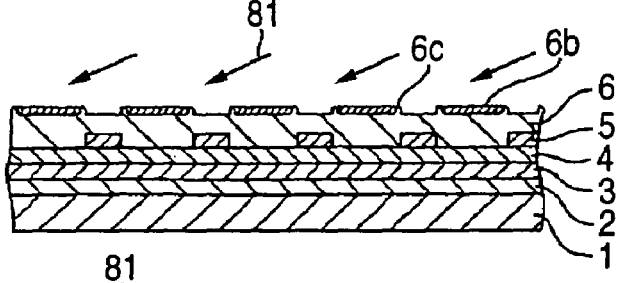

Next, as shown in FIG. 8C, the to-be-processed body is irradiated with the ion beam 81 at an incident angle of 30° still after the first non-magnetic layer 6 appears. Thus, ion beam etching is performed on the to-be-processed body. In the ion beam 81 at an incident angle of 30°, the etching rate of $SiO_2$ as the first non-magnetic layer 6 is higher than the etching rate of the second non-magnetic layer 6b made of the resist resin. Accordingly, the first non-magnetic layer 6 having a higher etching rate is mainly etched by the ion beam. Thus, the etched portions are changed into recess shapes. As a result, slant portions 6c are produced between the first non-magnetic layer 6 and the second non-magnetic layer 6b.

Figure 8D:
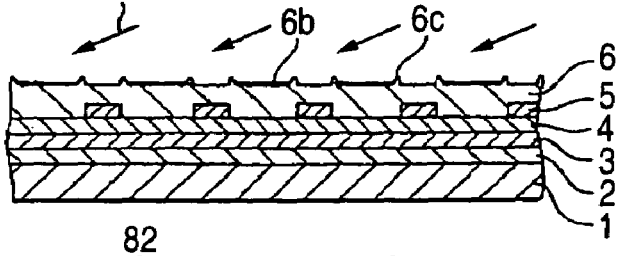

When the ion beam etching at an incident angle of 30° is further continued, the incident angle of the ion beam 81 on the slant portions 6c increases relatively as shown in FIG. 8D. Thus, the etching rate of the slat portions 6c becomes so low that portions other than the slat portions 6c are mainly etched by the ion beam. As a result, the slant portions 6c are formed into convex shapes, while the second non-magnetic layer 6b is also etched and thinned gradually by the ion beam.

Figure 8E:
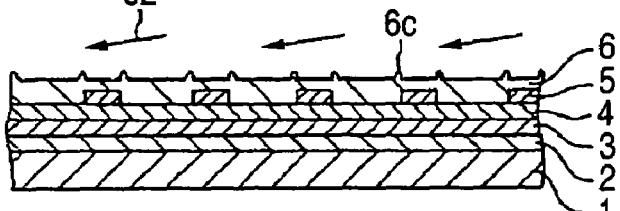

Next, as shown in FIG. 8E, ion beam etching is performed with an ion beam 82, for example, at an incident angle of 15°. Due to the ion beam etching, height of each of convex shapes produced in the step shown in FIG. 8D can be adjusted. That is, due to the ion beam etching by irradiation with the ion beam 82 at an incident angle of 15°, the etching rate of the convex shapes becomes higher than the etching rate of portions other than the convex shapes. Accordingly, the height of each of the convex shape can be adjusted.

Figure 8F:
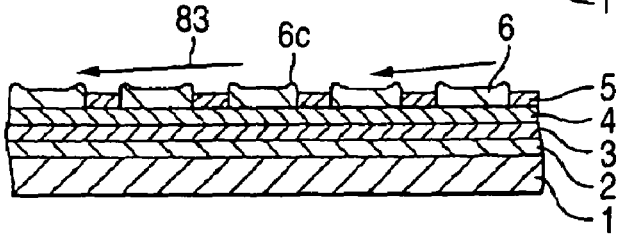
Figure 8G:
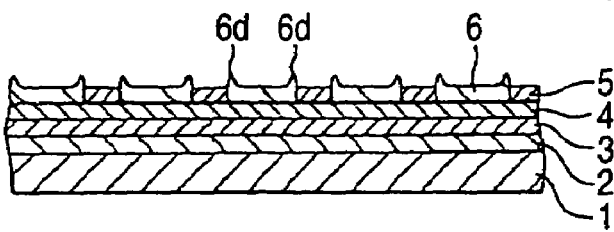

Next, as shown in FIG. 8F, ion beam etching is performed with an ion beam 83, for example, at an incident angle of 2°. Due to the ion beam etching, height can be adjusted between the magnetic recording layer 5 and the non-magnetic layer 6. That is, due to the ion beam etching by irradiation with the ion beam 83 at an incident angle of 2°, the etching rate of the non-magnetic layer 6 becomes higher than the etching rate of the magnetic recording layer 5. Accordingly, when the time of the ion beam etching is set desirably, the thickness-direction upper surface position on the non-magnetic layer 6 and the thickness-direction upper surface position on the magnetic recording layer 5 can be adjusted. For example, the thickness-direction upper surface position on the non-magnetic layer 6 can be made higher than the thickness-direction upper surface position on the magnetic recording layer 5. Alternatively, the former can be set on the same level as the latter, or the former can be made lower than the latter. Thus, as shown in FIG. 8G, convex shapes 6d and 6d formed on each non-magnetic layer element 6 are formed near the boundary portions with the magnetic recording layer elements 5 and 5 adjacent to the non-magnetic layer element 6. In the magnetic recording medium according to such a mode, due to the existence of the two small convex shapes 6d and 6d formed on each non-magnetic layer element 6, the contact area between the magnetic recording medium and the magnetic head in intermittent contact with the magnetic recording medium can be reduced so that the increase of frictional resistance between the magnetic head and the magnetic recording medium can be suppressed.

Incidentally, in the specification, the term "ion beam etching" is used as a generic term of processing methods, such as ion milling, for irradiating a to-be-processed body with ionized gas to thereby remove a layer. The ion beam etching is not limited to a processing method for irradiating the to-be-processed body with a narrowed ion beam. The term "incident angle" means an incident angle of an ion beam (ionized gas) with respect to the surface of the to-be-processed body, which angle is synonymous with the angle formed between the surface of the to-be-processed body and the central axis of the ion beam. For example, when the central axis of the ion beam is parallel to the surface of the to-be-processed body, the incident angle is 0°. When the central axis of the ion beam is perpendicular to the surface of the to-be-processed body, the incident angle is 90°.

In such a method, a to-be-processed body having convex shapes is formed. Next, the protective layer 7 is formed on the magnetic recording layer 5 and the non-magnetic layer 6 by a CVD (Chemical Vapor Deposition) method, and the lubricating layer 8 is formed further thereon by a dipping method. Thus, a magnetic recording medium according to the invention is completed.

As has been described above, in order to manufacture the magnetic recording medium according to the invention, convex shapes can be formed on the magnetic recording layer and/or the non-magnetic layer by optimizing processing conditions, particularly etching rates of the magnetic recording layer 5 and the non-magnetic layer 6, ion beam incident angle dependencies or gas dependencies of the etching rates, etc. When such convex shapes are formed in the track direction of the magnetic recording medium, the surface of the magnetic recording medium can be prevented from being too flat. Thus, it is possible to suppress increase in frictional resistance between the magnetic recording medium and the magnetic head. As a result, stiction between the magnetic recording medium and the magnetic head flying on the magnetic recording medium and for reproducing/recording magnetic recording information can be prevented so that occurrence of disk crush caused by the stiction can be suppressed.

EXAMPLES

The invention will be described below more in detail using its examples and comparative examples.

(Manufacturing of To-Be-Processed Body)

First, a to-be-processed body for forming a discrete track type magnetic recording medium was manufactured. A disk substrate 1 made of a glass substrate and having a thickness of 630 μm was filmed with an undercoat layer 2, a soft magnetic layer 3, an orientation layer 4, a magnetic recording layer 5 (20 nm thick), a first mask layer (TiN: 25 nm thick) and a second mask layer (Ni: 10 nm thick) in that order. The filmed sample was coated with negative type resist (brand name: NEB22A made by Sumitomo Chemical Co., Ltd.) by a spin coat method so that a resist layer 100 nm thick was formed. By use of a stamper having a predetermined concavo-convex shape, the concavo-convex shape was transferred to the resist layer on the sample surface by a press using a nano-imprint method, and ashing was performed. Thus, a resist pattern made from micro-figures was formed. Next, using the resist pattern as a mask, the micro-figures of the resist pattern were transferred to the second mask layer by an ion beam etching method using Ar gas. Thus, a second mask pattern made from the micro-figures was formed. Next, using the second mask pattern as a mask, the micro-figures of the second mask pattern were transferred to the first mask layer by a reactive ion etching method using $SF_6$ as reactive gas. Thus, a first mask pattern made from the micro-figures was formed. Next, using the first mask pattern as a mask, the micro-figures of the first mask pattern were transferred to the magnetic recording layer 5 by a reactive ion etching method using CO gas and $NH_3$ gas as reactive gas. Thus, a magnetic recording layer pattern made from the micro-figures was formed. Next, the first mask layer retained on the magnetic recording layer pattern was removed by a reactive ion etching method using $SF_6$ gas as reactive gas.

By the aforementioned method, a to-be-processed body for forming a discrete track type magnetic recording medium was manufactured. The processed dimensions of the magnetic recording layer pattern were 150 nm in track pitch, 90 nm in width of each convex portion of the magnetic recording layer, and 20 nm in depth of each concave portion.

Example 1

A non-magnetic layer 6 was formed on the to-be-processed body obtained thus. First, as a first film formation step, a film of $SiO_2$ was formed to be 5 nm thick by a sputtering method in the conditions of 500 W in film formation power and 0.3 Pa in Ar gas pressure. Next, as a second film formation step, a film of $SiO_2$ was formed thereon to be 45 nm thick by a sputtering method in the conditions of 500 W in film formation power, 0.3 Pa in Ar gas pressure and 150 W in bias power. Incidentally, the film thickness here means the thickness of a film on a flat surface when the film was formed on the flat surface in parallel.

Ion beam etching using Ar gas and having an incident angle of 2° was performed on the to-be-processed body for seven minutes and twenty-five seconds after the non-magnetic layer 6 was formed. Thus, a structure in which convex shapes were provided on the magnetic recording layer 5 was formed. DLC 2 nm thick was formed thereon as the protective film 7 by a CVD method. Further on the protective film 7, perfluoropolyether (PFPE) 2 nm thick was formed as the lubricating layer 8 by a dipping method. Thus, a magnetic recording medium 40 having a structure shown in FIG. 4 was manufactured.

The magnetic recording medium 40 manufactured thus had a mode in which convex shapes 42 made of a non-magnetic material were formed on the magnetic recording layer 5 having the lubricating layer 8 on its outermost layer as shown in FIG. 4. The height of each convex shape 42 was 1.0 nm. Each convex shape was formed into a mountain-like shape. Therefore, the upper surface width W1 of each convex shape was substantially zero.

Example 2

In Example 1, a non-magnetic layer 6 was formed on the to-be-processed body, and ion beam etching using Ar gas and having an incident angle of 2° was then performed on the to-be-processed body for seven minutes. After that, ion beam etching whose incident angle was changed to 90° was performed on the to-be-processed body for ten seconds. Thus, a structure in which convex shapes were provided on the magnetic recording layer 5 having the lubricating layer 8 on its outermost layer was formed. A magnetic recording medium 10 having a structure shown in FIG. 1 was manufactured in the same manner as in Example 1 except the aforementioned steps. Incidentally, the obtained magnetic recording medium had groove shapes in boundary portions between the magnetic recording layer 5 and the non-magnetic layer 6.

The magnetic recording medium 10 manufactured thus had a mode in which convex shapes 12 made of a non-magnetic material were formed on the magnetic recording layer 5 having the lubricating layer 8 on its outermost layer as shown in FIG. 1. The height of each convex shape 12 was 0.7 nm. The depth of each groove shape 11 formed in each boundary portion between the magnetic recording layer 5 and the non-magnetic layer 6 was 0.3 nm. Each convex shape was formed into a mountain-like shape. Therefore, the upper surface width W1 of each convex shape was substantially zero.

Example 3

In Example 1, a non-magnetic layer 6 was formed on the to-be-processed body, and ion beam etching using Ar gas and having an incident angle of 2° was then performed on the to-be-processed body for seven minutes. After that, ion beam etching whose incident angle was changed to 90° was performed on the to-be-processed body for fifteen seconds. Thus, the non-magnetic layer on the magnetic recording layer 5 was etched so that the magnetic recording layer 5 was exposed, while a structure in which convex shapes on the non-magnetic layer 6 were formed out of the non-magnetic layer 6 was formed. A magnetic recording medium 30 having a structure shown in FIG. 3 was manufactured in the same manner as in Example 1 except the aforementioned steps. Incidentally, the obtained magnetic recording medium had groove shapes in boundary portions between the magnetic recording layer 5 and the non-magnetic layer 6.

In the magnetic recording medium 30 manufactured thus, convex shapes 32 made of the same material as the non-magnetic layer 6 were formed on the non-magnetic layer 6, and the lubricating layer 8 was provided in its outermost layer as shown in FIG. 3. In the magnetic recording medium 30, the height-direction upper end position of each convex shape 32 was substantially on the same level as the upper surface position of the surface on the magnetic recording layer, and the boundary portions between the magnetic recording layer 5 and the non-magnetic layer 6 had groove shapes 31 which were 0.5 nm deep. That is, this means that the sum of the height of each convex shape 32 and the groove depth of each groove shape 31 was 0.5 nm.

Fourth Example

In Example 1, a non-magnetic layer 6 was formed on the to-be-processed body, and ion beam etching using Ar gas and having an incident angle of 2° was then performed on the to-be-processed body for seven minutes. After that, ion beam etching whose incident angle was changed to 90° was performed on the to-be-processed body for five different periods of 28 seconds, 24 seconds, 20 seconds, 18 seconds and 17 seconds. Thus, a structure in which convex shapes made of the non-magnetic material forming the non-magnetic layer 6 were provided in the non-magnetic layer 6 was formed. Magnetic recording media 20 each having a structure shown in FIG. 2 were manufactured in the same manner as in Example 1 except the aforementioned steps. In this event, the etching rate of the ion beam etching when the incident angle was 2° was 1.7 nm/min in the magnetic recording layer 5 and 4.6 nm/min in the non-magnetic layer 6. On the other hand, the etching rate of the ion beam etching when the incident angle was 90° was 30.9 nm/min in the magnetic recording layer 5 and 24.9 nm/min in the non-magnetic layer 6. Incidentally, each of the obtained magnetic recording media had groove shapes in boundary portions between the magnetic recording layer 5 and the non-magnetic layer 6.

In each of the magnetic recording media 20 manufactured thus, convex shapes 32 of the non-magnetic layer 6 were formed as shown in FIG. 2. The height of each convex shape 22 was 3.0 nm when the ion beam etching time was 28 seconds, 2.0 nm when the ion beam etching time was 24 seconds, 1.0 nm when the ion beam etching time was 20 seconds, 0.4 nm when the ion beam etching time was 18 seconds, and 0.1 nm when the ion beam etching time was 17 seconds. Incidentally, in each case, the depth of each groove shape 21 formed in each boundary portion between the magnetic recording layer 5 and the non-magnetic layer 6 was 0.1 nm. Each convex shape was formed into a mountain-like shape. Therefore, the upper surface width W2 of each convex shape was substantially zero.

In the five kinds of magnetic recording media different in ion etching beam time and obtained in Example 4, the height of each convex shape 22 was 3.0 nm, 2.0 nm, 1.0 nm. 0.4 nm and 0.1 nm respectively, as described above. These measured values were different from their theoretical values obtained from the aforementioned etching rates. This is because the etching rate in an edge portion of the magnetic recording layer pattern increases so as to increase the difference in etching rate between the magnetic recording layer 5 and the non-magnetic layer 6.

Figure 10:
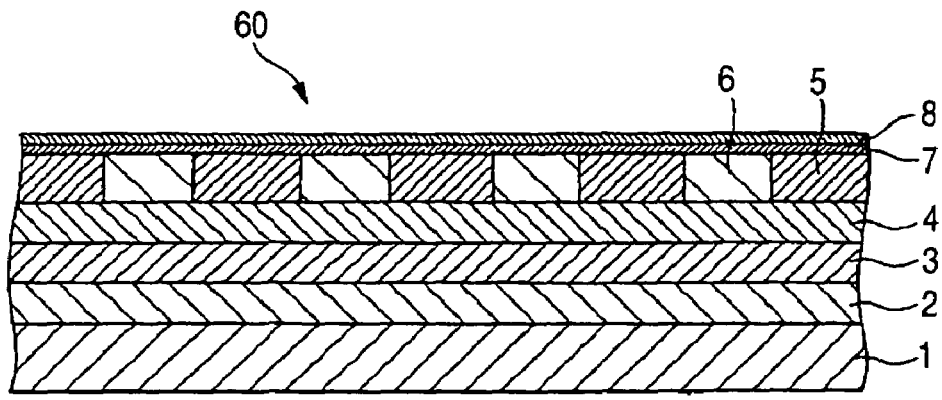
FIG. 10 is a schematic sectional view showing an example of a magnetic recording medium used as a sample for comparison.

Table 1 shows the number of crushed pieces after a CSS test measured using ten samples of each example, and an average value of measured results of flying fluctuation. The CSS (Contact Start Stop) test is a measuring method in which a magnetic recording medium is rotated and stopped repeatedly in the state where a magnetic head is in contact with the surface of the magnetic recording medium. The CSS test was performed for 50 hours, and it was then confirmed whether there was a crush mark or not. The flying fluctuation measurement is performed using an LDV (Laser Doppler Vibrometer) with the flying position of the magnetic head being fixed to a position of 20 mm in radius. Incidentally, as a magnetic recording medium whose convex shapes were 0 nm high, magnetic recording media 60 in which no convex shape or no groove was formed were manufactured as shown in FIG. 10, and evaluated as comparative samples.

As is apparent from the results in Table 1, no crush occurred in any magnetic recording medium according to the invention, that is, any magnetic recording medium in which the sum of the height of each convex shape and the groove depth of each groove shape was not smaller than 0.2 nm, and the height of each convex shape was not larger than 2 nm. As for the flying fluctuation of the magnetic head, the flying fluctuation was 2 nm when the height of each convex shape was small, but the flying fluctuation reached 6 nm when the height of each convex shape was increased. Thus, it was proved that there is no influence when the height of each convex shape is small, but the flying fluctuation increases when the height of each convex shape is large.

TABLE 1

| convex shape height (nm) | sum of convex shape height and groove depth (nm) | number of crushes (pieces) | flying fluctuation (nm) |
| --- | --- | --- | --- |
| 3.0 | 3.1 | 0 | 6 |
| 2.0 | 2.1 | 0 | 3 |
| 1.0 | 1.1 | 0 | 2 |
| 0.4 | 0.5 | 0 | 2 |
| 0.1 | 0.2 | 0 | 2 |
| 0 | 0 | 6 | 2 |

Example 5

In the aforementioned manufacturing method of a to-be-processed body, a to-be-processed body for use in Example 5 has processed dimensions of the magnetic recording layer pattern which were 360 nm in track pitch, 130 nm in width of each convex portion of the magnetic recording layer, and 22 nm in depth of each concave portion.

The to-be-processed body obtained thus was filmed with $SiO_2$ to be 40 nm thick by a sputtering method in the conditions of 500 W in film formation power and 0.3 Pa in Ar gas pressure. Next, negative type resist (brand name: NEB22A made by Sumitomo Chemical Co., Ltd.) was applied thereon by a dipping method, so that a second non-magnetic layer 6b made of a resist layer 76 nm thick was formed. Thus, a to-be-processed body shown in FIG. 8A was manufactured.

Ion beam etching similar to that in the manufacturing process of a magnetic recording medium as described in FIGS. 8A-8G by way of example was performed on the to-be-processed body in which the first non-magnetic layer 6 and the second non-magnetic layer 6b made of the resist layer had been formed. The ion beam etching was under the etching rates shown in FIG. 9. That is, ion beam etching using Ar gas and having an incident angle of 30° was performed for two minutes and twelve seconds (see FIGS. 8B-8D and description thereof). After that, ion beam etching at an incident angle of 15° was performed for twenty seconds (see FIG. 8E). Further after that, ion beam etching at an incident angle of 2° was performed for one minute and five seconds (see FIG. 8F). The to-be-processed body (see FIG. 8G) subjected to these ion beam etching processes had a structure in which convex shapes (the reference numeral 6d in FIG. 8G) made of a non-magnetic material forming the non-magnetic layer 6 were formed on the non-magnetic layer 6, while the convex shapes were formed near boundary portions with the magnetic recording layer (the reference numeral 5 in FIG. 8G) adjacent to the non-magnetic layer. DLC 2 nm thick was formed thereon as the protective film 7 by a CVD method. Further on the protective film 7, perfluoropolyether (PFPE) 2 nm thick was formed as the lubricating layer 8 by a dipping method. Thus, a magnetic recording medium in Example 5 was manufactured.

The magnetic recording medium 50A manufactured thus had a mode in which convex shapes 52 and 52 (the reference numeral 6d in FIG. 8G) made of a non-magnetic material forming the non-magnetic layer 6 were formed on the non-magnetic layer 6 as shown in FIG. 5A. The height of each convex shapes 52 and 52 was 1.5 nm. Each convex shape was formed into a mountain-like shape. Therefore, the upper surface width W2 of each convex shape was substantially zero. In any case, each convex shape in each non-magnetic layer element 6 was formed to be included in a position about 70 nm distant from an edge portion of each of magnetic recording layer elements 5 and 5 adjacent to the non-magnetic layer element 6 so as to put the non-magnetic layer element 6 therebetween.

What is claimed is:

1. A magnetic recording medium comprising:
   a disk substrate;
   a magnetic recording layer formed with a predetermined concavo-convex pattern on said disk substrate;
   a non-magnetic layer formed in concave portions of said concavo-convex pattern; and
   convex shapes made of a non-magnetic material formed on said non-magnetic layer,
   wherein a width of an upper surface of each of said convex shapes is smaller than one third (⅓) of a width of each of said concave portions where said non-magnetic layer is formed, and the width of said upper surface of each of said convex shapes is measured in an upper plane that is parallel to a surface of the disk substrate and includes an upper-most surface point of each of said convex shapes.

2. A magnetic recording medium according to claim 1, wherein each of said convex shapes is a mountain-like shape in which an upper portion is smaller in width than a lower portion thereof.

3. A magnetic recording medium according to claim 1, wherein said convex shapes on said non-magnetic layer are made of at least the same material as said non-magnetic layer.

4. A magnetic recording medium according to claim 3, wherein the upper-most point of each of said convex shapes is more distant from the disk substrate than an upper-most point of said magnetic recording layer.

5. A magnetic recording medium according to claim 3, wherein the upper-most point of each of said convex shapes is substantially a same distance from the disk substrate as an upper-most point of said magnetic recording layer.

6. A magnetic recording medium according to claim 3, wherein each of said convex shapes is arranged near a boundary portion between said non-magnetic layer and said magnetic recording layer adjacent to said non-magnetic layer element, and said convex shapes project away from said disk substrate to be upper than a center portion of a top surface of the non-magnetic layer.

7. A magnetic recording medium according to claim 1, wherein height of each of said convex shapes is not smaller than 0.2 nm and not larger than 2 nm.

8. A magnetic recording medium according to claim 1, wherein boundary portions between said magnetic recording layer and said non-magnetic layer have groove-like shapes each including a groove that extends toward the disk substrate to be lower than a center portion of a top surface of the non-magnetic layer.

9. A magnetic recording medium according to claim 8, wherein the sum of height of each of said convex shapes and groove depth of each of said groove-like shapes is not smaller than 0.2 nm, and said convex shape height is not larger than 2 nm.

10. A magnetic recording medium according to claim 1, wherein said upper surface of said convex shape has a flat surface whose width is not larger than one third (⅓) of said width of each of said convex portions of said magnetic recording layer or width of each of said concave portions where said non-magnetic layer is formed.

11. A magnetic recording medium comprising:
a disk substrate;
a magnetic recording layer formed with a predetermined concavo-convex pattern on said disk substrate;
a non-magnetic layer formed in concave portions of said concavo-convex pattern; and
convex shapes made of a non-magnetic material formed on said magnetic recording layer,
wherein a width of an upper surface of each of said convex shapes is smaller than one third (⅓) of a width of each of convex portions of said concavo-convex pattern of said magnetic recording layer, and the width of said upper surface of each of said convex shapes is measured in an upper plane that is parallel to a surface of the disk substrate and includes an upper-most surface point of each of said convex shapes.

12. The magnetic recording medium according to claim 11, wherein each of said convex shapes is a mountain-like shape in which an upper portion is smaller in width than a lower portion thereof.

13. The magnetic recording medium according to claim 11, wherein said convex shapes on said magnetic recording layer are made of at least the same material as said non-magnetic layer.

14. The magnetic recording medium according to claim 11, wherein height of each of said convex shapes is not smaller than 0.2 nm and not larger than 2 nm.

15. The magnetic recording medium according to claim 11, wherein boundary portions between said magnetic recording layer and said non-magnetic layer have groove-like shapes each including a groove that extends toward the disk substrate to be lower than a center portion of a top surface of the non-magnetic layer.

16. The magnetic recording medium according to claim 15, wherein the sum of height of each of said convex shapes and groove depth of each of said groove-like shapes is not smaller than 0.2 nm, and said convex shape height is not larger than 2 nm.

17. The magnetic recording medium according to claim 11, wherein said upper surface of said convex shape has a flat surface whose width is not larger than one third (⅓) of said width of each of said convex portions of said magnetic recording layer or width of each of said concave portions where said non-magnetic layer is formed.

* * * * *